United States Patent Office 3,475,647
Patented Oct. 28, 1969

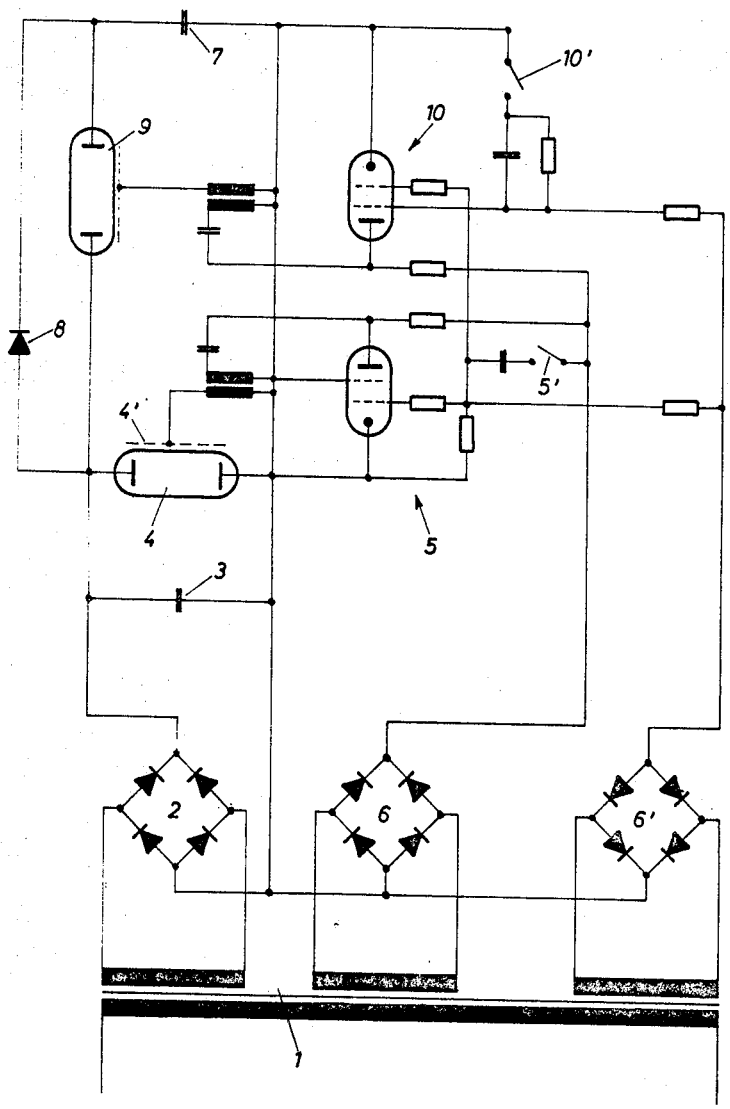

3,475,647
PHOTOFLASH SYSTEM WITH A SETTING CONDENSER AND A MAIN CONDENSER IN PARALLEL ACROSS THE DISCHARGE LAMP
Wolfgang Ludloff, Porz-Westhoven, Germany, assignor of one-half to Gesellschaft fur Multiblitzgerate Dr.-Ing. D.A. Mannesmann mbH
Filed Oct. 5, 1967, Ser. No. 673,128
Claims priority, application Germany, Oct. 10, 1966, G 48,125
Int. Cl. H05b 39/09
U.S. Cl. 315—183                                                    4 Claims

ABSTRACT OF THE DISCLOSURE

Flash apparatus for studio purposes with a flash discharge tube which is stroboscopically operated at reduced output for setting-up illumination including a first storage capacitor which can be rapidly discharged via the flash discharge tube to provide stroboscopic setting-up illumination and a second storage capacitor of relatively large capacitance which can also be discharged via the flash discharge tube to produce an intensive exposure illumination flash.

Background of the invention

The invention relates to flash apparatus for studio purposes with a flash discharge tube which is stroboscopically operated at reduced output for setting-up operation and is connected to a storage capacitor. In such apparatus it has already been proposed to connect the flash discharge tube to a second storage capacitor to produce an illumination flash. In the prior apparatus of this kind, it is necessary to provide separate circuits for the stroboscopic discharge and for the exposure flash discharge and to switch off the stroboscopic illumination by a changeover switch before the exposure flash can be triggered. This leads to a relatively complicated circuit and causes considerable changeover switching difficulties because changeover switching must be performed on a storage capacitor charged to a high energy level for the exposure flash discharge.

The object of the invention is to avoid these difficulties and to superimpose a discharge of the exposure flash on to the stroboscopic discharge which remains switched on, while at the same time the circuit is simplified.

To solve the problem, the invention provides that the second storage capacitor is connected in parallel to the first storage capacitor but is connected to the charging voltage via a blocking rectifier which prevents discharge via the flash discharge tube and that the aforementioned blocking rectifier is linked by an auxiliary discharge tube connected in parallel thereto and having a low internal resistance. The auxiliary discharge tube is so dimensioned that the pressure rise in the discharge chamber is low in the event of a discharge. Accordingly, both storage capacitors are connected in parallel to each other and to the flash discharge tube and are connected to the same charging voltage. Owing to the presence of the blocking rectifier, the second storage capacitor provided for the exposure flash can be discharged via the flash discharge tube only in the event of triggering of the auxiliary discharge tube which is connected in parallel to the blocking rectifier. The aforementioned auxiliary discharge tube may be so constructed that it converts the least possible amount of energy of the second storage capacitor into illumination energy by arranging for the internal resistance of the aforementioned auxiliary discharge tube to be as low as possible and by adopting a relatively large size for the discharge chamber to ensure that the pressure rise in the discharge chamber remains low in the presence of a relatively large current flow.

It is known that the generation of light by discharge tubes of the kind heretofore described depends on the pressure rise. By making due allowances for these characteristics it is possible without difficulty to construct a discharge tube so that it generates as little light as possible when it passes a large current. It is therefore merely necessary to trigger such an auxiliary discharge tube which is connected in parallel to the blocking rectifier in order to superimpose an exposure flash of substantially greater intensity upon the setting up illumination. Changeover switching from stroboscopic setting-up illumination to the exposure flash is not necessary.

Description of the drawing

The accompanying drawing shows the circuit diagram of a flash apparatus according to one embodiment of the invention now described by way of example.

Description of specific embodiment

A DC voltage from a power source, comprising a power transformer 1 and a full wave rectifier 2, charges a first storage capacitor 3. A flash discharge tube 4, provided with a trigger electrode 4', is connected in parallel to the storage capacitor 3. The trigger electrode 4' forms part of a known stroboscopic trigger system 5 which is driven with DC voltage from the mains transformer 1 via the rectifiers 6, 6'. After closing a switch 5', the trigger electrode 4' is provided in known manner with voltage surges at relatively high frequency, so that the storage capacitor 3 is discharged at rapid intervals through the flash discharge tube 4 to provide stroboscopic setting-up illumination.

By means of rectifier 8 or auxiliary discharge tube 9, a second storage capacitor 7 of relatively large capacitance, is connected in parallel to the flash discharge tube 4 and to the storage capacitor 3 and to the charging voltage of the rectifier system 2. The second storage capacitor 7 is serially preceded by the blocking rectifier 8, so that the storage capacitor 7 can be charged but cannot be immediately discharged through the flash discharge tube 4. The blocking rectifier 8 is bridged by an electronic switch comprising an auxiliary discharge tube 9 having a low internal resistance and being so dimensioned that a relatively high current flow is accompanied by a low pressure rise and accordingly by the generation of a low level of illumination. The trigger electrode 9' of the auxiliary discharge tube 9 forms part of a simple trigger system 10, which is also supplied with DC via the rectifiers 6, 6'. When a switch 10' is closed, the auxiliary discharge tube 9 is triggered to result in current flow without any substantial energy losses to enable the second storage capacitor 7 to be discharged via the flash discharge tube 4, while producing an intensive exposure illumination flash.

I claim:
1. In a flash apparatus for studio purposes comprising a flash discharge tube, means including a power source and a first capacitor connected across the tube to produce pulsating illumination of the tube for setting up operation and a second capacitor to produce an illumination flash from said tube, the improvement comprising:
   first means including a rectifier connecting said second capacitor to said power source to charge said capacitor while blocking the discharge thereof; and
   second means including an electronic switch having a conductive state and a non-conductive state, said second means connecting said second capacitor across said flash tube and in parallel with said first capacitor for blocking the discharge of the second capacitor when the switch is in the non-conductive state and for discharging said second capacitor across said tube to produce said illumination flash when said switch is rendered conductive.

2. In an apparatus as set forth in claim 1, wherein said electronic switch includes an auxiliary flash tube so dimensioned that a discharge therethrough is accompanied only by a slight use in pressure therein.

3. In an apparatus as set forth in claim 2, wherein said electronic switch has a trigger electrode, said second means includes manually operable means connected to said trigger electrode to render said switch conductive, and said auxiliary tube has a comparatively low internal resistance when conductive.

4. In an apparatus as set forth in claim 1, wherein said electronic switch has a trigger electrode, said second means includes manually operable means connected to said trigger electrode to render said switch conductive.

References Cited

UNITED STATES PATENTS

| | | | |
|---|---|---|---|
| 2,342,257 | 2/1944 | Edgerton | 315—238 |
| 2,781,707 | 2/1957 | Edgerton | 315—241 X |
| 2,917,668 | 12/1959 | Witterson | 315—240 X |
| 3,267,328 | 8/1966 | Girard | 315—163 |
| 3,316,450 | 4/1967 | Troubetzkoi | 315—240 X |

JAMES W. LAWRENCE, Primary Examiner

C. R. CAMPBELL, Assistant Examiner

U.S. Cl. X.R.

315—171, 173, 230, 241; 320—1